(12) United States Patent
Persiantsev et al.

(10) Patent No.: US 6,307,971 B1
(45) Date of Patent: Oct. 23, 2001

(54) METHOD AND APPARATUS FOR DIGITAL DATA COMPRESSION

(75) Inventors: Michael I. Persiantsev, Nevada City; Rajugopal R. Gubbi, Fair Oaks; Joseph D. Harwood, Fremont, all of CA (US)

(73) Assignee: Sharewave, Inc., El Dorado Hills, CA (US)

( * ) Notice: Subject to any disclaimer, the term of this patent is extended or adjusted under 35 U.S.C. 154(b) by 0 days.

(21) Appl. No.: 09/653,903

(22) Filed: Sep. 1, 2000

Related U.S. Application Data

(62) Division of application No. 09/164,942, filed on Oct. 1, 1998.

(51) Int. Cl.$^7$ ..................................................... G06K 9/36
(52) U.S. Cl. ............................................................ 382/236
(58) Field of Search ................................... 382/232, 233, 382/236, 238, 240, 242, 248, 250; 358/432, 433; 348/384, 394, 395, 400–404, 407–416, 420, 421, 425, 430, 431, 699

(56) References Cited

U.S. PATENT DOCUMENTS

| | | | |
|---|---|---|---|
| 4,217,609 | 8/1980 | Hatori et al. | 358/136 |
| 4,302,775 | 11/1981 | Widergren et al. | 358/136 |
| 4,394,774 | 7/1983 | Widergren et al. | 382/56 |
| 4,571,618 | 2/1986 | Hatori et al. | 358/136 |
| 4,646,148 | 2/1987 | Lienard et al. | 368/135 |
| 4,704,628 | 11/1987 | Chen et al. | 358/136 |
| 4,827,339 | 5/1989 | Wada et al. | 358/136 |
| 5,046,119 | 9/1991 | Hoffert et al. | 382/56 |
| 5,086,480 | 2/1992 | Sexton | 382/18 |
| 5,091,782 | 2/1992 | Krause et al. | 358/135 |
| 5,146,325 | 9/1992 | Ng | 358/135 |
| 5,177,796 | 1/1993 | Feig et al. | 382/56 |

(List continued on next page.)

OTHER PUBLICATIONS

"Video Compression makes big gains", *IEEE Spectrum*, (Oct. 1991) pp. 16–19.

*Primary Examiner*—Jose L. Couso
(74) *Attorney, Agent, or Firm*—Blakely Sokoloff Taylor & Zafman LLP

(57) ABSTRACT

The quality of digital images recovered from compressed data in an inter-frame redundancy-removing scheme is enhanced using a self-adaptive feedback scheme in an image compression/decompression system so as to include means for the compensation of the distortion component from prior frame compression in subsequent difference frame compression. Each transmitted frame is stored after a full compress/decompress cycle, and difference data (which includes the inverse of the distortion component from compression of the transmitted frame) representing the difference between the stored frame and the incoming new frame is transmitted. Consequently, the quality of static regions in the recovered images may be improved with each subsequent iteration by taking the distortion component in the prior frame into consideration along with the inter-frame motion information. The feedback loop thus forms a self-adaptive iterative cycle.

5 Claims, 9 Drawing Sheets

U.S. PATENT DOCUMENTS

| | | | |
|---|---|---|---|
| 5,185,819 | 2/1993 | Ng et al. | 382/56 |
| 5,267,334 | 11/1993 | Normille et al. | 382/56 |
| 5,278,915 | 1/1994 | Chupeau | 382/1 |
| 5,295,201 | 3/1994 | Yokohama | 382/48 |
| 5,305,113 | 4/1994 | Iwamura et al. | 358/312 |
| 5,327,173 | 7/1994 | Nishizawa et al. | 348/412 |
| 5,347,308 | 9/1994 | Wai | 348/394 |
| 5,379,356 | 1/1995 | Purcell et al. | 382/56 |
| 5,386,234 | 1/1995 | Veltman et al. | 348/409 |
| 5,408,542 | 4/1995 | Callahan | 382/56 |
| 5,428,693 | 6/1995 | Murakami et al. | 382/232 |
| 5,432,870 | 7/1995 | Schwartz | 382/232 |
| 5,467,134 | 11/1995 | Laney et al. | 348/409 |
| 5,473,380 | 12/1995 | Tahara | 348/423 |
| 5,497,338 | 3/1996 | Miyake et al. | 364/514 |
| 5,509,089 | 4/1996 | Choshal | 382/236 |
| 5,519,790 | 5/1996 | Manning | 382/236 |
| 5,544,266 | 8/1996 | Koppelmans et al. | 382/238 |
| 5,553,160 | 9/1996 | Dawson | 382/166 |
| 5,570,133 | 10/1996 | Yagasaki | 348/416 |
| 5,574,504 | 11/1996 | Yagasaki et al. | 348/415 |
| 5,592,229 | 1/1997 | Sugiyama | 348/416 |
| 5,598,483 | 1/1997 | Purcell et al. | 382/232 |
| 5,600,737 | 2/1997 | Kurakami et al. | 382/232 |
| 5,602,594 | 2/1997 | Cho et al. | 348/419 |
| 5,612,744 | 3/1997 | Lee et al. | 348/416 |
| 5,867,602 * | 2/1999 | Zandi et al. | 382/248 |
| 5,870,502 * | 2/1999 | Bonneay et al. | 382/249 |
| 5,875,108 * | 2/1999 | Hoffberg et al. | 364/146 |
| 5,881,176 * | 3/1999 | Keith et al. | 382/248 |
| 5,901,246 * | 5/1999 | Hoffberg et al. | 382/209 |
| 5,946,417 * | 8/1999 | Bonneau et al. | 382/236 |
| 5,966,465 * | 10/1999 | Keith et al. | 382/232 |
| 6,125,201 * | 9/2000 | Zador | 382/166 |

* cited by examiner

METHOD AND APPARATUS FOR DIGITAL DATA COMPRESSION

This application is a divisional application of application Ser. No. 09/164,942, filed on Oct. 1, 1998.

FIELD OF THE INVENTION

The present invention relates to digital data compression, and in particular to a scheme for temporal coherent image data compression, and more particularly to a self-adaptive compression scheme for motion digital video compression.

BACKGROUND

With the convergence of digital information in the home, a need has arisen for the integration of home computers with other information appliances. In co-pending application Ser. Nos. 08/792,003 and 08/792,361, both filed Jan. 31, 1997, and assigned to the Assignee of the present invention, an exemplary digital wireless home network was described. The network has at its heart an information furnace that allows users to enjoy a variety of multimedia content distributed from a host computer to various appliances throughout the home. Within this vision of the information furnace, the home computer is established as the central aggregation point for digital content in the home, which content is then wirelessly distributed to locations and appliances throughout the home that are optimal for its consumption. These alternative consumption locations enable new dynamics in the use of multimedia content, including mobility, comfort, social interaction, and linkages with other household appliances, such as audio/visual systems. The information furnace further allows users to consume the content in their preferred locations (and even be mobile in the home if desired), enables multiple users to simultaneously interact with the content, and reduces the cost of the appliances used to access the content (computing resources, such as the CPU, memory and modem are leveraged from a central source).

The distribution of video information as part of the home network environment presents certain challenges for the network designer. For example, with the increasing popularity of multimedia applications there is increasing use of digitally encoded visual data. Thus, digitally encoded video images will need to be transmitted across wired and wireless communication channels of the network, for applications such as video-conferencing, interactive computing, entertainment programming, etc. These digital images are, by nature of their graphical content, relatively more complex than, say, digital audio and, thus, require significant bandwidth within the communication channels to transport the complex information embodying the images. Further, multimedia applications often include "synthetic", or computer-generated, images (e.g., the image of a spread-sheet or a page generated by a word processing application) that have little or no relative motion from frame to frame, but are nevertheless high contrast images. Such images often include a very high amount of energy in their high-frequency spatial range, as compared to so-called "natural" images (e.g., a picture of a person). Transmitting these images within a communication channel also requires the use of significant bandwidth. Accordingly, to transport such information efficiently, and in real time, digital imaging applications hinge on the use of data compression techniques to reduce the amount of information to be transmitted within the network to manageable levels.

In light of the above, it is not surprising that image data compression often involves reducing the amount of data required to represent a digital image. One common basis of the reduction process is the removal of redundant data. In addition, inherent non-linearities in human visual perception can be leveraged to reduce the amount of data to be displayed in succeeding frames of a motion video. Accordingly, existing compression schemes exploit correlation in both space and time for video signals. Spatial compression is known as intra-frame compression, while temporal compression is known as inter-frame compression.

Generally, methods that achieve high compression ratios (e.g., over 50:1) are lossy, in that the data that is reconstructed from a compressed image is not identical to the original. The "losses" experienced in the compression process are manifested as distortions in the reconstructed images. While lossless compression methods do exist, their compression ratios are far lower. For most commercial, industrial and consumer applications, lossy methods are preferred because they save on required storage space and communication channel bandwidth.

Lossy compression methods tend to be acceptable because they generally exploit nonlinear aspects of human visual system. For instance, the human eye is much more receptive to fine detail in the luminance (or brightness) of an image, than in the chrominance (or color) thereof. Also, the eye is less sensitive to distortions in the high-frequency range of an image's spatial spectrum, especially in the presence of motion. As a result, in viewing a sequence of images reconstructed from a lossy compression scheme, the human eye is more forgiving to the presence of high frequency compression coding artifacts (e.g., distortion of edges) in a moving video than in a static image. That is, motion images may mask compression coding artifacts that would be otherwise visible in still images.

Various techniques have been adopted as industry standards for motion image compression, including Recommendation H.261 of the Consultative Committee on International Telephony and Telegraphy (CCITT) for video conferencing, and schemes proposed by the Moving Pictures Expert Group (MPEG) for full-motion compression for digital storage medium. While such video compression methods can compress data at high ratios with acceptable quality in the decompressed images, they do not necessarily provide high data compression ratios for use in limited bandwidth environments such as home networks.

Further, these prior compression processes do not include means for correcting distortions that may be present in earlier-transmitted frames. For example, in those prior video compression schemes that attempt to improve compression efficiency by reducing inter-frame redundancy with the use of "motion estimation" and/or "motion prediction", earlier-transmitted frames are updated by compressing and transmitting the difference between a current frame and a preceding frame. In this manner, the compression process is made more efficient, as subsequent frames do not need to be compressed in their entirety if the extent of the changes between frames is limited. For example, in a video recording of a swinging pendulum in front of a static but feature-rich background, the inter-frame changes may be only those sections of the frames of the video corresponding to the swinging movements of the pendulum. Only these changes need to be compressed and transmitted, without the need to transmit the same feature rich background in all the frames. Then to reconstruct the current frame, the preceding-transmitted frame is updated with the transmitted changes.

Although these schemes tend to conserve bandwidth, it is likely that distortions will be present in the earlier-transmitted frames. Thus, such distortions are necessarily carried through to subsequent frames. Moreover, with each new frame, additional compression distortions will be introduced into the reconstructed images. Consequently, the compression distortions tend to accumulate from frame to frame, yet these prior compression schemes do not provide means to reduce or eliminate these distortions.

SUMMARY OF THE INVENTION

In one embodiment, a method for enhancing the quality of digital images recovered from compressed data in an inter-frame redundancy-removing scheme is provided. Briefly, a self-adaptive feedback scheme is deployed in an image compression/decompression system so as to include means for the compensation of the distortion component from prior frame compression in subsequent difference frame compression. This may be implemented by storing each transmitted frame after a full compress/decompress cycle, and transmitting the difference data (which includes the inverse, or negative, of the distortion component from compression of the transmitted frame) representing the difference between the stored frame and the incoming new frame. Consequently, the quality of static regions in the recovered images may be improved with each subsequent iteration by taking the distortion component in the prior frame into consideration along with the inter-frame motion information. The feedback loop thus forms a self-adaptive iterative cycle.

In a further embodiment, wavelet analysis is deployed to enhance the efficiency of a data compression scheme that employs adaptive feedback. Each incoming image frame represented in the spatial domain is transformed into the wavelet domain before being compressed and transmitted (e.g., to a remote receiver). The compressed data may be fed back and stored in an accumulation buffer without wavelet synthesis. Then, difference data to be transmitted in the next frame is obtained by comparing the incoming frame and the stored frame, which are both in wavelet represention.

In another embodiment, data quantization may be carried out using a number of bit allocation planes for each of a number of Mallat blocks to be transmitted and/or retained for storage, so as to meet transmission bandwidth limitations and/or data storage space limitations in a data compression scheme. The number of bit planes allocated to a given Mallat block is determined in accordance with required accuracy or resolution for a frequency range represented by that block. Low frequency blocks may be given a higher priority over high frequency blocks and, accordingly, may have more bit planes allocated than are allocated for the high frequency blocks.

In still another embodiment, a post augmentation scheme may be deployed at the decompression side of a compression/decompression system to enhance the accuracy of data that was subject to quantization (e.g., arising from Mallat blocks that were assigned an incomplete number of bit planes). According to this scheme, the actual value of the recovered data is taken to be between the indicated value with non-transmitted bits being one and its indicated value with all non-transmitted bits being zero. For example, the reconstructed value may be taken to be the average or median of the above two values, which statistically minimizes the quantization error, being in the middle of "uncertainty" interval.

Still further embodiments are discussed in the following description and its accompanying drawings.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A video processing scheme that may find application in a digital wireless home network or other computer network environments is disclosed herein. Although discussed with reference to certain illustrated embodiments, upon review of this specification, those of ordinary skill in the art will recognize that the present invention may find application in a variety of systems. Therefore, in the following description the illustrated embodiments should be regarded as exemplary only and should not be deemed to limit the scope of the present invention.

Figure 1:
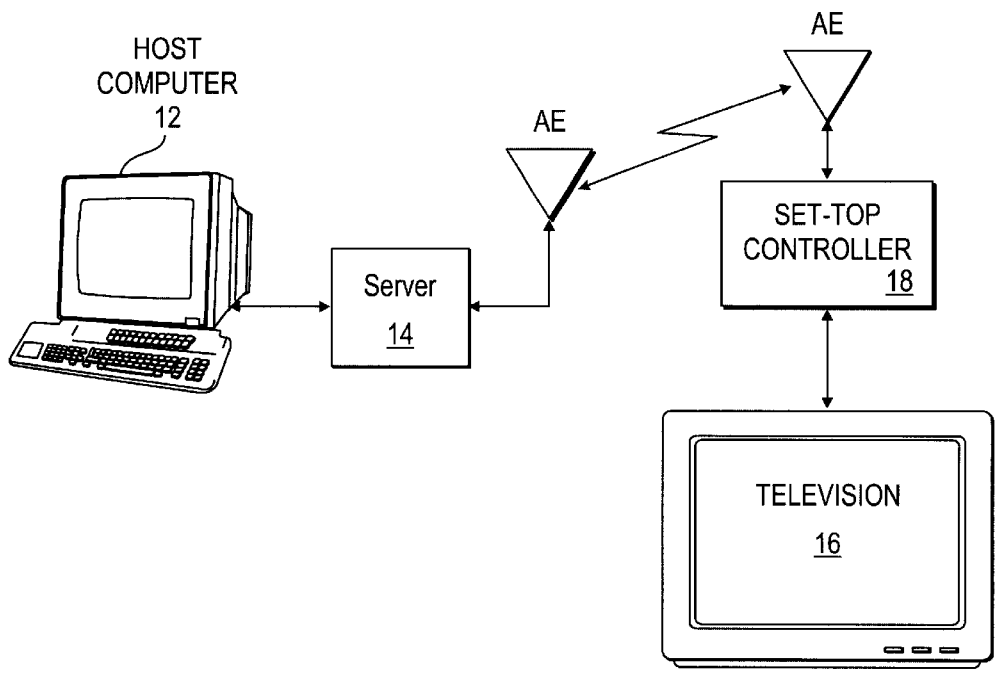
FIG. 1 illustrates components of a digital wireless home network according to one embodiment of the present invention.

FIG. 1 illustrates a digital wireless home network 10 configured in accordance with one embodiment of the present invention. Digital wireless home network 10 has at its heart a personal computer 12 and an accompanying server 14. Together, personal computer 12 and server 14 act as a central aggregation point for digital content (e.g., video, audio and graphical information), which content may then be wirelessly distributed to various locations and appliances, including television 16. Television 16 receives this digital content through set-top controller 18, which is coupled in wireless communication with server 14. Of course, in other embodiments, the wireless communication link between server 14 and set-top controller 18 may be replaced by a wired communication link. Also, although server 14 and set-top controller 18 are illustrated as separate components, in other embodiments the functions of server 14 may be included wholly or partially within personal computer 12 and those of set-top controller 18 may be included wholly or partially within television 16.

Included within the digital content transferred to television 16 across network 10 is video information. In one embodiment, the video information comprises digitally encoded video images relating to applications such as videoconferencing, interactive computing, entertainment and/or educational programming, etc. Preferably, this video information is transferred in a compressed data format to ease bandwidth requirements on the wireless (or wired) communication link.

Within the environment of network 10, the video information transferred to television 16 may originate as synthetic or computer-generated video information as may be produced or utilized by an application program running on personal computer 12. For example, network 10 allows a user session (separate from any other session that may be hosted on personal computer 12) to be initiated using set-top controller 18 as a gateway to personal computer 12 (e.g., via server 14). Thus, television 16 may be used as a display device for this session. As part of the session, computer-generated images (such as may comprise a user desktop and/or application specific image) will be displayed on television 16.

In general, the computer-generated video information for display on television 16 will be first produced at host computer 12 in a format more suited for display on a conventional, noninterlaced computer monitor. This is because computer application programs and operating systems are generally configured to provide video information for display on such devices. Therefore, before this video information can be displayed on television 16, it will have to be converted into a compatible format, for example, interlaced NTSC-compatible video. Server 14 and set-top controller 18 provide the necessary video display processing means to generate video information suitable for display on television 16 from the computer-generated video information provided by host computer 12.

Figure 2A:
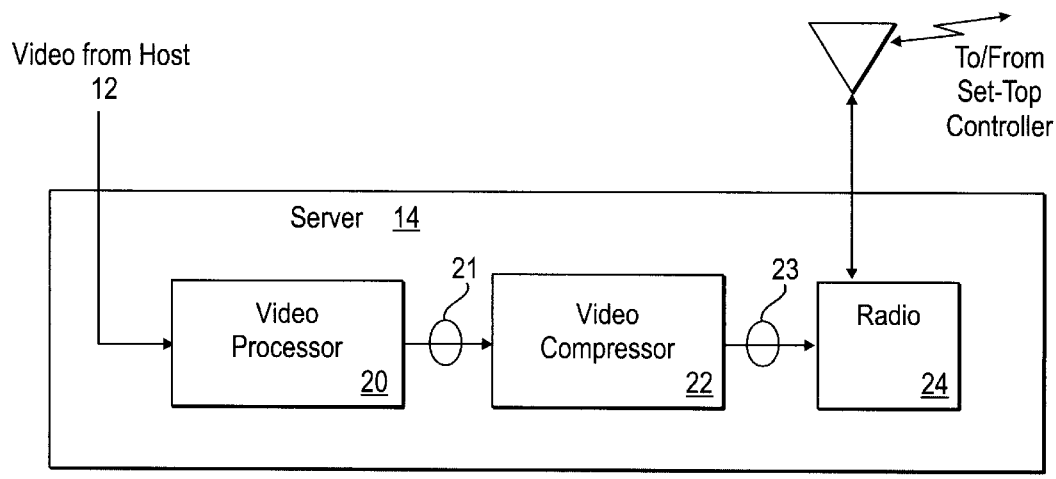
FIG. 2A is a functional representation of a server component of the digital wireless home network illustrated in FIG. 1 according to one embodiment of the present invention.
Figure 2B:
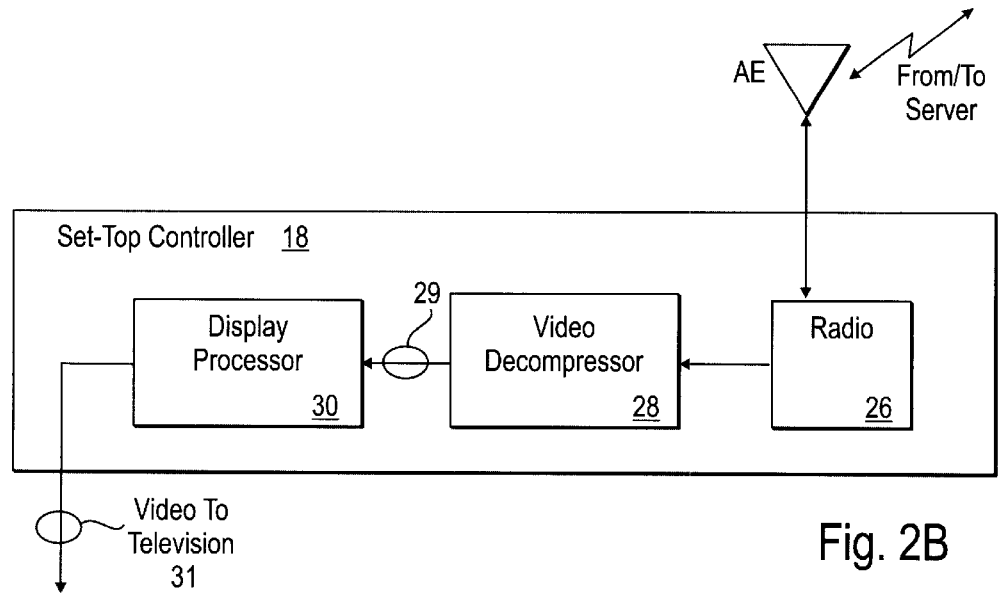
FIG. 2B is a functional representation of a set-top controller component of the digital wireless home network illustrated in FIG. 1 according to one embodiment of the present invention.

FIGS. 2A and 2B illustrate the functional components of server 14 and set-top controller 18 used in the conversion of the video information to a format suitable for display on television 16. As shown in FIG. 2A, video processor 20 receives video information from host computer 12. Video processor 20 is responsible for scaling the video information to a size appropriate for display on television 16. In general, computer-generated video information is produced with a vertical resolution that exceeds the usable display range of television 16, thus vertical scaling is required to fit the information into the display area provided by television 16. As part of the scaling process, video processor 20 may utilize antiflicker filtering to reduce or eliminate the effects of flicker on the eventual display.

Many times, computer-generated video information is produced in an R-G-B (red-green-blue) format common to computer display devices. Although such video information may be transmitted within digital network 10, in one embodiment, video processor 20 is configured to convert or transform the R-G-B information into another color scheme, e.g., Y-Cr-Cb color space, which is more suitable for transmission to television 16. In Y-Cr-Cb color space, Y represents the luminance component of the video information while Cr and Cb represent the chrominance components.

The converted (and perhaps scaled) video information 21 is provided to video compressor 22 where it is reformatted prior to transmission to television 16. Any of a number of conventional video compression techniques may be used to reduce the bandwidth requirements of the video information 21. In one embodiment, a video compressor that utilizes wavelet compression technology (as discussed in detail below) may be used. As indicated above, the use of a video compressor 22 is optional, however, any scheme which does not employ some form of video compression will require more bandwidth for the transmission of the video information than schemes which do.

The compressed video data 23 is provided to a radio 24, which may packetize the data for transmission across the wireless communication link to set-top controller 18. In those schemes that rely on a wired communication link, other suitable media access devices (e.g., Ethernet access modules, etc.) may be used in place of radio 22. In one embodiment, radio 22 communicates with set-top controller 18 using a wireless, spread spectrum communication protocol adapted for use in network 10.

Now referring to FIG. 2B, at set-top controller 18 the video information from server 14 is received by radio 26. Radio 26 is configured to operate according to the same protocol as radio 24 in server 14; hence, the two radios 24 and 26 serve as the communication access devices for network 10. As indicated above, in other embodiments, e.g., where different communications media are used, other suitable communication media access devices may be used. Radio 26 may perform frame reconstruction operations to build up a complete frame of information from several packets that were transmitted by radio 24. Ultimately, radio 26 provides a frame's worth of compressed video information to a video decompression engine 28.

Video decompression engine 28 expands the compressed video information received from server 14 into a decompressed format and provides the resulting video information signals 29 to a display processor 30. Display processor 30 formats the video signals 29 into the required format for display on television 16. For example, in some embodiments, display processor 30 may provide the necessary horizontal and or vertical synchronization signals as well as dithering control and interlacing sequences required to display the video information on a conventional NTSC compatible television 16. Thus, set-top controller 18 provides NTSC (or other, e.g., PAL) compatible television video signals 31 to television 16.

Figure 3:
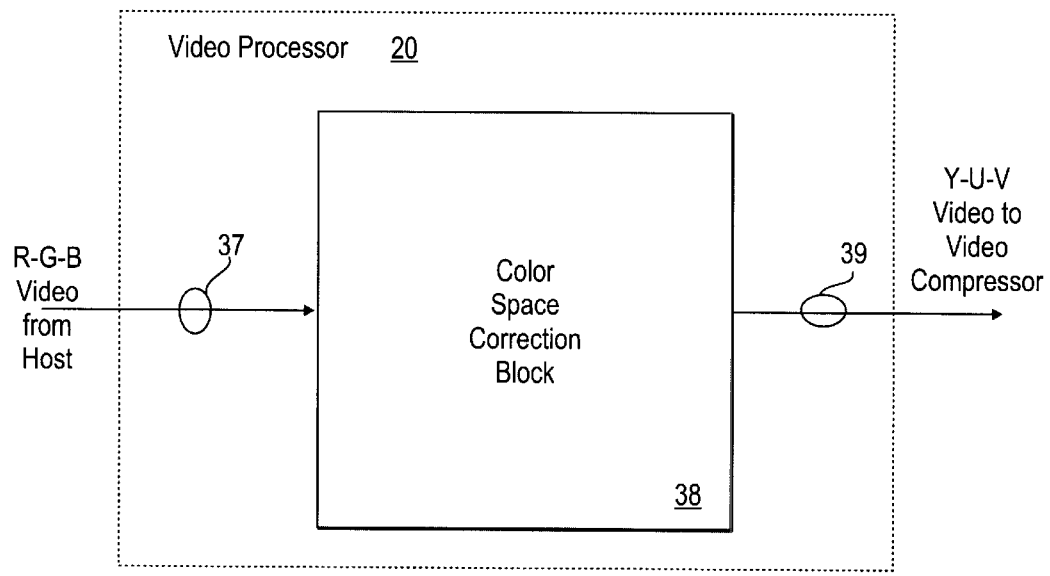
FIG. 3 illustrates some of the functional components of a video processor for the server component of the digital wireless home network illustrated in FIG. 2A according to one embodiment of the present invention.

FIG. 3 now illustrates one embodiment of video processor 20 of server 14 in more detail. Video processor 20 includes a color space correction (CSC) block 38. As noted above, CSC block 38 transforms R-G-B video information signals 37 to Y-Cb-Cr video information signals 39 prior to transmission of the video information from the server 14 to the set-top controller 18. In one embodiment, CSC block 38 performs this conversion according to the following formulas:

$$Y=0.257R+0.504G+0.098B+16$$

$$Cb=-0.148R-0.291G+0.439B+128$$

$$Cr=0.439R-0.368G-0.071B+128$$

The inverse transforms (e.g., for use a display processor 30) are:

R=1.164(Y−16)+1.596(Cr−128)

G=1.164(Y−16)−0.813(Cr−128)−0.392(Cb−128)

B=1.164(Y−16)+2.017(Cb−128)

In practice, it is expected that nominal ranges for Y, Cb and Cr are 16-235, 16-240 and 16-240, respectively, with a value of 128 equal to zero.

The R-G-B color information for each pixel of a frame received from host computer 12 is preferably presented to CSC block 38 in 16-bit format, with five bits of red and blue color information each, and six bits of green color information. Thus, there will be 32 ($2^5$) grades of R and B component and 64 ($2^6$) grades of G component. Before converting the R-G-B color information to Y-Cr-Cb color information, however, these values are preferably rounded up (i.e., normalized) to eight bit values.

Many schemes exist for converting the $R_5G_6B_5$ information to $R_8G_8B_8$ information. For example, bit roll over schemes such as the following may be used:

$x_5 \rightarrow x_4x_3x_2x_1x_0[x_4x_3x_2]$ (8.0), where X represents R or B; and $X_6 \rightarrow x_5x_4x_3x_2x_1x_0[x_5x_4]$ (8.0), where X represents G.

That is, to produce the eight bit representations of the five-bit red and blue color values, the five bits of color information may be padded with the three most significant bits thereof as new least significant bits. Similarly, the six-bit green color information may be padded to eight bits, using the two most significant bits thereof as new least significant bits. Other methods, such as adding random "noise" to the least significant bits of the eight-bit color value representations may also be used. In one particular embodiment, however, a unique mid-banding scheme, as described in co-pending Application Ser. No. 09/151,473, entitled "Method and Apparatus for Color Space Conversion of Video Signals", filed Sep. 11, 1998, by Michael L. Persiantsev and Rajugopal R. Gubbi and assigned to the assignee of the present application, is used to produce the eight-bit color value representations from the $R_5G_6B_5$ video information signals.

Figure 4:
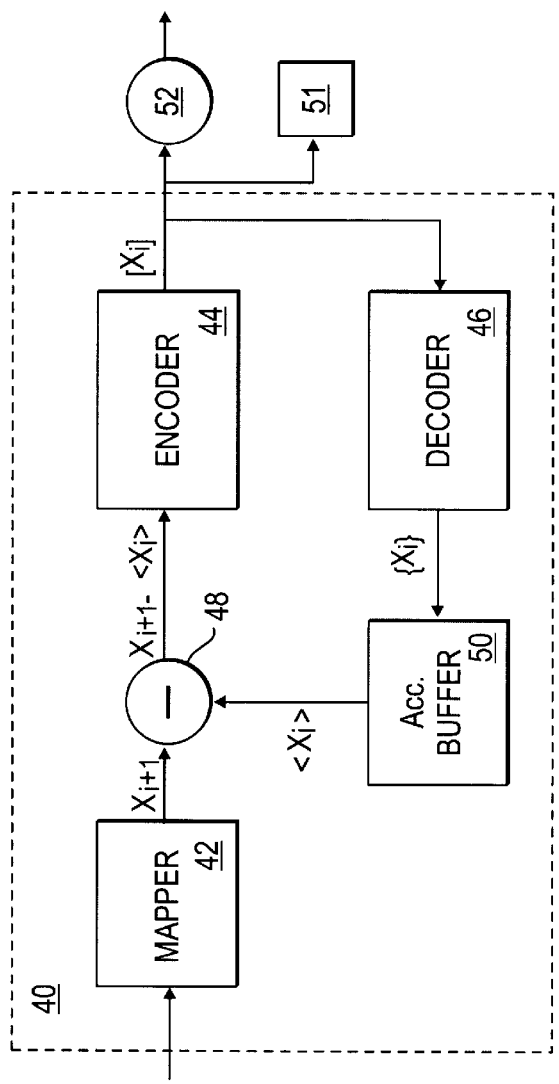
FIG. 4 is a schematic block diagram of a compression engine that adopts an adaptive feedback scheme in accordance with one aspect of the present invention.

The midbanded R-G-B video information signals may then be converted to Y-Cr-Cb video information signals and the resulting image data applied to video compressor 22. Video compressor 22 provides an adaptive feedback feature, which automatically and continually builds up the quality of transmitted compressed images. FIG. 4 is a schematic block diagram of a compression engine 40, which illustrates the concept of the adaptive feedback scheme used by video compressor 22. The compression engine 40 includes a mapper 42 that transforms (in a lossless manner) the image data into a format suitable for digital compression encoding. Also present is an encoder 44 data compression (a lossy device). A decoder 46, which is coupled to the encoder along a feedback path, provides data decompression (and is a lossless device). Specifically, the decoder 46 is coupled to the output of the encoder 44 and to the input of the encoder 44 via a subtractor 48. An accumulation buffer 50 is provided to store the decompressed data output of the decoder 46. The compressed data from the encoder 44 is transmitted to a storage device 51 and/or to another site (e.g., set-top controller 18) via a transmission channel 52 (e.g., a wired or wireless channel).

The mapper 42 may be configured to perform lossless transforms such as sub-band encoding, which may include transformation of two-dimensional spatial image data into spatial frequency filtered sub-bands (e.g., wavelet analysis). If the raw image data is in analog form, the mapper 42 may also be configured to perform conversion of the analog signal into digital data prior to such transformation (possibly, involving some loss). The encoder 44 may include a quantizer (a lossy device) and an entropy encoder (e.g., a Huffman, or arithmetic, entropy encoder, a lossless device) such as are well known in the art, and the decoder 46 may include an entropy decoder (e.g., a Huffman, or arithmetic, entropy decoder). Although encoder 44 and decoder 46 are schematically shown by separate blocks they could be embodied in a single physical unit having both encoding and decoding functions. The specific structures of the mapper 42, encoder 44 and decoder 46 are not critical to the feedback concept of the present invention.

Figure 5:
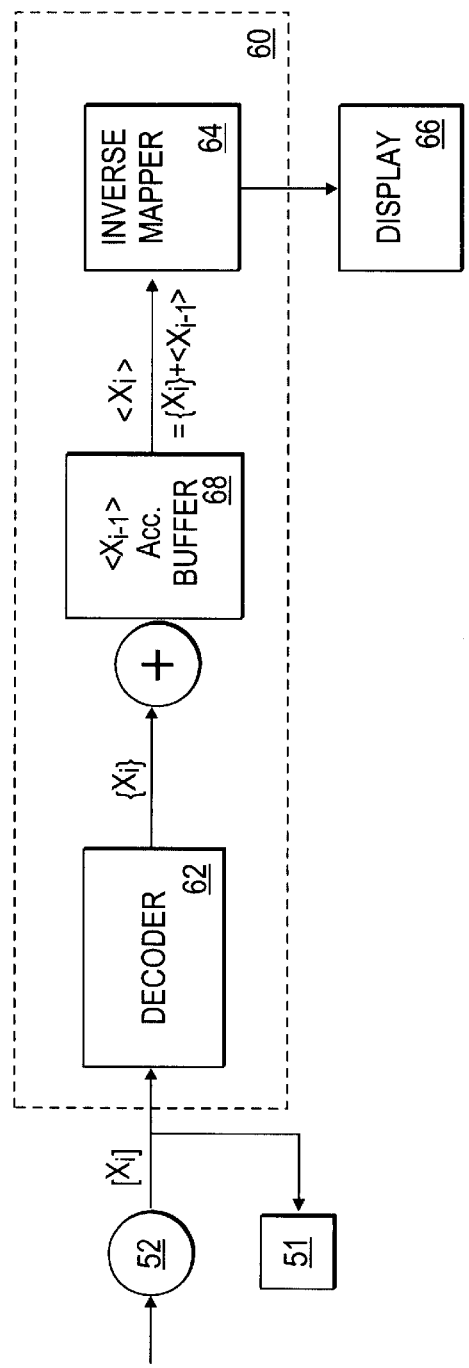
FIG. 5 is a schematic block diagram of a complementary decompression engine for decompression data compressed by the compression engine of FIG. 4.

FIG. 5 is a schematic block diagram of a complementary decompression engine 60 as may be utilized in video decompressor 28. The decompression engine 60 is functionally the reverse of the compression engine 40. It is structured essentially in reverse of the compression engine 40, except that the feedback loop is omitted. Specifically, decompression engine 60 includes a decoder 62 (a lossless device that may include an entropy decoder) for decompressing the incoming compressed data from the storage device 51 or received over the transmission channel 52. Also included is an inverse mapper 64, for inverse transformation of the decompressed data (e.g., wavelet synthesis filter bank, a lossless transformation) and further into a form (e.g., analog signals) that is suitable, for example, for displaying the transmitted image using a display 66. An accumulation buffer 68 is provided to store the decompressed frame data. As is in the case of the compression engine 40, the exact structures and substructures of the various components of the decompression engine 60 are not critical to the feedback concept of the present invention.

The operations of the compression and decompression engines are as follows. Given the example of a sequence of N video frames, the mapper 42 produces transformed frames $X_i$ (i=0 to N; $X_0$=0) that are suitable for digital compression encoding. The first video frame $X_1$ enters the encoder 44 and is compressed into compressed frame $[X_1]$ (a glossy process; $[X_1]$ includes a loss or distortion component). While the compressed frame $[X_1]$ is transmitted via the channel 52, the same data is simultaneously forwarded to the decoder 46. The compressed frame $[X_1]$ is decompressed by the decoder 46 into decompressed data $\{X_1\}$ (a lossless process), which is stored in the accumulation buffer 50 as decompressed frame data $<X_1>$ (which includes a distortion component).

When the next frame $X_2$ arrives, the stored decompressed frame data $<X_1>$ is subtracted from the frame $X_2$ by the subtractor 48. Accordingly, the "image" frame that is fed to the encoder contains the inter-frame image difference and the distortion component from the previous frame, which is represented by the difference data $(X_2-<X_1>)$. The encoder 44 compresses this difference data into compressed difference data $[X_2]$ (including a new distortion component for this difference data). Unless a scene change occurs between frame $X_1$ and $X_2$, the difference data $[X_2]$ will contain at least an order of magnitude less energy than frame $X_1$. That is, changes between consecutive frames for a typical 30 frames per second video sequence will be small. Therefore difference data $[X_2]$ lends itself to much easier compression (i.e., because there are fewer non-zero pixels and more bits per non-zero pixel, there is expected to be less distortion). The compressed difference data $[X_2]$ is transmitted via the channel 22. The compressed difference data $[X_2]$ is also decompressed by the decoder 46 into decompressed difference data $\{X_2\}$, and added to the decompressed frame data $<X_1>$ in the accumulation buffer 50 to form decompressed frame data $<X_2>$.

Data $<X_2>$ is subtracted from the next frame $X_3$ and so on. This iterative process is repeated for all the frames $X_i$. It is noted that for ease of discussion of the feedback scheme, the data representations $[X_i]$ and $<X_i>$ refer to difference data for all i>1 (an exception for "key frames" is discussed below).

At the receive side, the compressed data $[X_1]$ received over the channel 52 is decompressed by the decoder 62 into decompressed data $\{X_1\}$ in a lossless process, which decompressed data is then stored in the accumulation buffer 68 as decompressed frame data $<X_1>$. In this first iteration (i=1), the decompressed data $\{X_1\}$ is reconstructed frame data $<X_1>$. The inverse mapper 64 reverse transforms the decompressed data $<X_1>$ into a form suitable for display or further display processing. The next compressed data received is the difference data $[X_2]$. This difference data is decompressed by the decoder 62 into decompressed difference data $\{X_2\}$ and added to the preceding decompressed frame data $<X_1>$ in the accumulation buffer 68 to form new decompressed frame data $<X_2>$ (which will be processed by the inverse mapper 64). The decompression engine 60 operates on all the incoming compressed data $[X_i]$ in this iterative fashion. It is noted that for ease of discussion of the feedback scheme, $\{X_i\}$ and $[X_i]$ refer to difference data for all i>1 (the exception for "key frames" will be discussed later below).

Thus, in accordance with the feedback scheme of the present invention, each subsequent frame that is compressed and transmitted in essence contains information relating to the motion aspect of the consecutive frames, and the distortion (e.g., from quantization) resulting from the compression of the earlier frame or frames. Accordingly, the distortions from earlier frames are not ignored, but are instead saved and applied towards improving the quality of subsequent frames. The self-adaptive quality enhancing effect of the present invention will become apparent following the discussion of the underlying mathematical theory of the present invention below.

It is noted that in practice, the input frames to the compression engine 40 may be component frames (such as representing one of the Y-Cr-Cb or R-G-B color components). Further, in the above example, all subsequent new frames are taken to be "difference frames" that are referenced against frame changes following the first frame ("key frame") in the inter-frame redundancy reduction process described above. In a real video sequence, however, there may be other "key frames" in the video sequence depending on the extent of the inter-frame image changes. If a change is significant (e.g., above a preset threshold), then the new frame may become a new key frame reference for subsequent difference frames in the redundancy reduction process, until a next key frame comes along. Without the key frame distinction, if the extent of the inter-frame differences were large (e.g., in the event of scene change), inter-frame redundancy reduction may become inefficient if difference frames were continued to be used. The process for distinguishing key frames versus difference frames and applicability of key frames and difference frames in the feedback scheme of the present invention will be discussed in greater detail below.

The underlying mathematical theory of the self-adaptive quality enhancing effect of the present feedback scheme for video data compression will now be explained with reference to the following designations:

$x_i$=incoming data frames, for i=1, 2, . . . N;

W=vector space transformation operator, e.g., wavelet analysis (linear, lossless transform) in the mapper 42;

Q=quantization operator (nonlinear, lossy) in the encoder 44;

$W^{-1}$=the inverse transformation operator, e.g., wavelet synthesis (lossless transform) in the inverse mapper 64;

H=entropy encoder operator (lossless) in the encoder 44;

$H^{-1}$=entropy decoder operator (lossless) in the decoder 62;

T=overall compress/decompress sequence operator.

The compress/decompress operator T can be expressed as $T=W^{-1}H^{-1}HQW$, with the sequence of operations going from right to left. Since the only lossy operator in this expression is quantization Q, operator T can be simplified to $T=W^{-1}QW$.

Assuming that a single step of compress/decompress operation results in the transmission of the image x and introduction of an error $\delta$, then $$Tx=(1+\delta)x, \text{ where } |\delta|<<1.$$

Then, after transmitting and storing the result of the first frame compression/decompression, $Tx_1$, in the accumulation buffer 50 at the transmitter side (and in the accumulation buffer 68 at the receiver side), subtracting it from the second frame $x_2$, compressing it and transmitting the difference $(x_2-Tx_1)$, adding the decompressed addition $T(x_2-Tx_1)$ to the previously stored $Tx_1$ in the accumulation buffer 68 at the receiver side, then the second frame transmission received at the receiver is given by:

$$Tx_1+T(x_2-Tx_1)=(1+\delta_1)x_1+(1+\delta_2)[x_2-(1+\delta_1)x_1]$$

$$=x_2+\delta_2(x_2-x_1)-\delta_1\delta_2 x_1$$

which is approximately=$x_2+\delta_2(x_2-x_1)$

Comparing this result with the result of the first frame transmission, $(x_1+\delta_1 x_1)$, it can be seen that a single iteration brought the magnitude of the error introduced by compression down, by an order of magnitude proportional to the difference between the frames versus the frame itself. In addition, adaptive quantizers usually employed in encoding implementations work in such a way that the less energy a frame has, the less distortion is introduced by the quantizer at a given bit transmission budget. Therefore, it can be safely stated that for quantization of the second (difference) frame, $\delta_2$ is approximately equal to $\delta_1(x_2-x_1)/x_1$, or $|\delta_2|<<|\delta_1|$. Accordingly, it can be appreciated that the cumulative error in the reconstructed image is reduced with each new frame of the image.

One implementation of the feedback scheme may be regarded as follows. After frame x has been compressed into frame y (=HQWx), frame y is transmitted and decompressed on an the receiver side. Frame y is transformed to received frame $x_R=W^{-1}H^{-1}y$. At the same time, $z=W^{-1}QW$ is stored on the transmitter side. When the next frame $x_+$ arrives, the difference $(x_{30}-z)$ is determined, to create a new image where each component (R-G-B or Y-Cr-Cb) of every pixel will be equal to the difference between the corresponding components of $x_+$ and z.

It is interesting to note that by storing the result of a full (compress/decompress) cycle in the transmitter, and taking only a difference for further transmission, the feedback feature of the present invention effectively closes a transformation loop, thus turning it into a self-adapting iterative cycle. It should be further noted that an image compression scheme having such closed loop feedback essentially builds up the quality of static regions in the images while simultaneously transmitting inter-frame motion information represented by the interframe difference data.

I. Compression Processing

Figure 6:
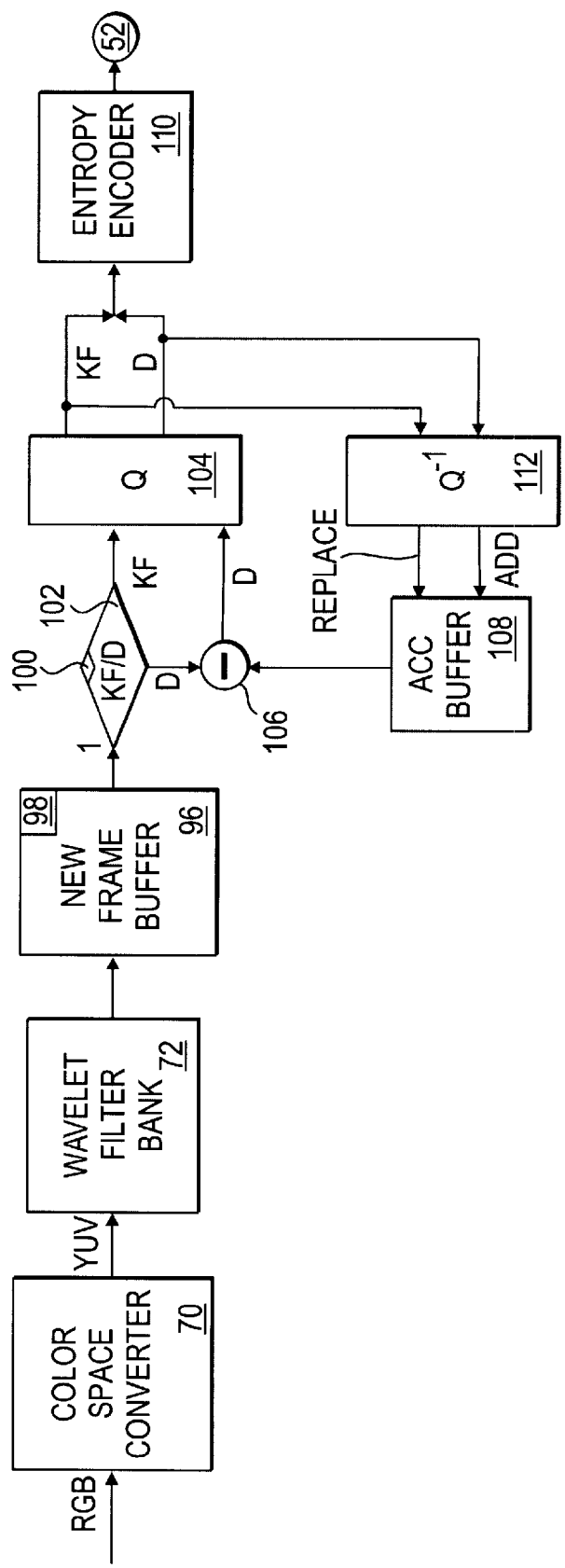
FIG. 6 is a more detailed schematic block diagram of an implementation of the compression scheme having the feedback feature of the present invention.

With the foregoing concept and theory of the present feedback scheme in mind, and referring to FIG. 6, one embodiment of an implementation of a compression scheme having the adaptive feedback feature of the present invention is explained in greater detail with reference to the compression and transmission of a sequence of digital video images that are represented in the R-G-B, 24-bit (true color), space. As indicated above, such R-G-B representation is the usual format used by digital computers to produce digital video images.

a. Color Space Conversion

A color space converter 70 is provided to transform the incoming video signal from one color space representation into another color space representation that is more efficient for data compression. The color space converter 70 may be part of a graphics processor. For example, the image pixels generated by a computer for display on a monitor are typically represented in R-G-B color space. R-G-B are primary color components, each manifesting a single color (red, green or blue), and in combination manifest secondary colors. It is necessary for all these color components to be present to manifest the secondary colors. Accordingly, in order to represent the values of the color components digitally (i.e., in bits) for each image pixel, a certain, constant, number of bits (e.g., 8 bits) are allocated to each component. Consequently, there is a significant amount of data to be compressed for each frame (e.g., for a 640×480-pixel frame, the number of data points is 3 times the number of pixels). Further, in order to maintain the quality of the reconstructed images, the compression efficiency of RGB data is inherently limited. In order to increase data compression efficiency for purpose of data transmission through limited bandwidth channels, it is desirable to transform the RGB data into the Y-Cr-Cb (or Y-U-V) color vector space. Here, Y is luminance, and U and V are chrominance components, which together represent the brightness and the color of an image pixel.

The human eye is more sensitive to variations in luminance across an image frame but less sensitive to variations in chrominance. Hence, it is possible to allocate fewer samples to the chrominance components for each frame. Specifically, the same chrominance value may be used for every pair of pixels without significantly degrading the quality of the reconstructed image as perceived by the human eye.

For example, the color space transformation may apply a 4:2:0 or 4:2:2 subsampling technique. Regarding 4:2:0 subsampling, for every 4 pixels in a 2×2 block, separate luminance values Y are provided for each pixel, one average value for U, and one average value for V. Regarding 4:2:2 subsampling, for every pair of adjacent pixels on one scan line, separate luminance values are provided for each, and average chrominance values are provided for both U and V components. Thus, for a frame having 640×480 pixels, there would be 680×480 Y data points, 320×480 U data points and 320×480 V data points. Accordingly, as compared to luminance, only half as many data points are required to represent the U and V components of each frame. By using the 4:2:2 scheme then, the amount of data for an image represented in Y-U-V space is two-thirds the amount of data necessary to represent the same image in the R-G-B space (provided the same integer precision is used for each color component). Each of the Y, U and V frames are subject to compression and transmission as discussed above, and the frames are decompressed and reconstructed at the receiver side.

b. Wavelet Analysis

To further reduce the size of the data that is to be compressed and transmitted, the Y, U and V frames are subject to a data compaction process at a wavelet filter bank 72 prior to compression. The wavelet filter bank 72 performs wavelet analysis and data compaction. Although the general theory of wavelet analysis is, by itself, well known in the art, the application of wavelet analysis in the compression scheme of the present invention is new. For the sake of completeness, the wavelet analysis in the context of the present invention will be discussed below. Reference may be made to G. Strang and T. Nguen, *Wavelets and Filter Banks*, Wellesley-Cambridge Press, 1996, for a further understanding of wavelet analysis techniques in general. Further, it should be recognized that there are a number of available algorithms that may be adopted for wavelet analysis. The algorithm developed by Analog Devices, Inc. and incorporated in its ADV 601 chip is one example of a suitable algorithm for wavelet analysis.

Generally, wavelet analysis converts a frame represented in spatial domain into wavelet domain (i.e., space-frequency domain). It is a mathematical transformation, involving the use of a set of filters and decimators to implement two-dimensional sub-band coding. Thus, two-dimensional spatial video data is transformed into frequency filtered sub-bands for each frame and the frequency components are subsequently quantized.

Figure 7:
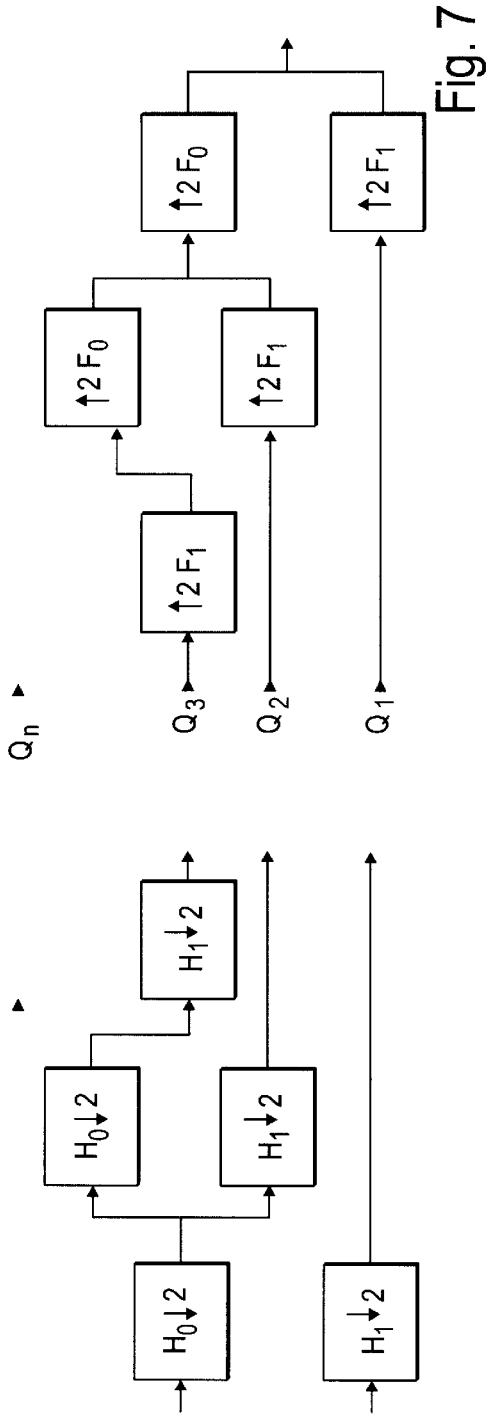
FIG. 7 is a schematic illustration of the filter function of the wavelet filter bank.
Figure 8:
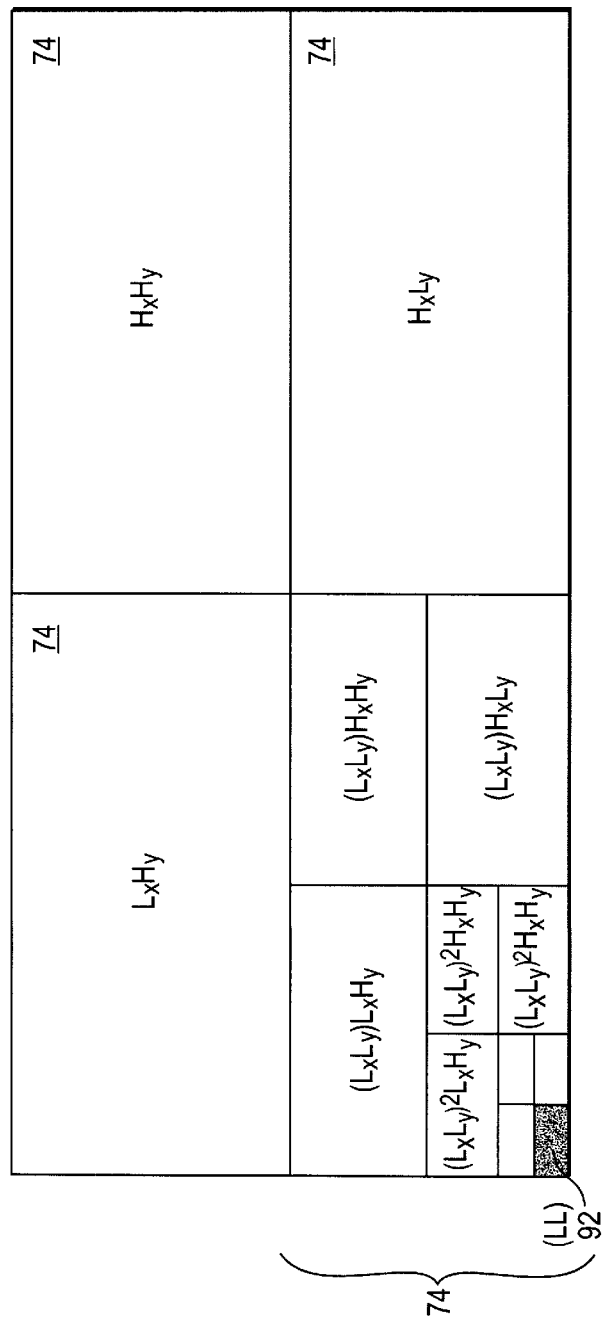
FIG. 8 is a schematic illustration of a frame split into Mallat blocks.

FIG. 7 schematically illustrates the wavelet analysis process. $H_1$ and $H_0$ are the analysis high-pass and low-pass filters, respectively, while $F_1$ and $F_0$ are the synthesis counterparts thereof. The filters are designed such that in the absence of a quantizer, perfect reconstruction of the incoming signal is achieved. When applied to a two-dimensional image, the analysis part of a wavelet filter bank expands the image area into separated bands 74 (called Mallat blocks) in each dimension, as shown in FIG. 8. Here L and H denote an output of the low-pass and high-pas filter stages, respectively, and the indices x and y denote the dimension (horizontal or vertical) in which the filter was applied.

Figure 9:
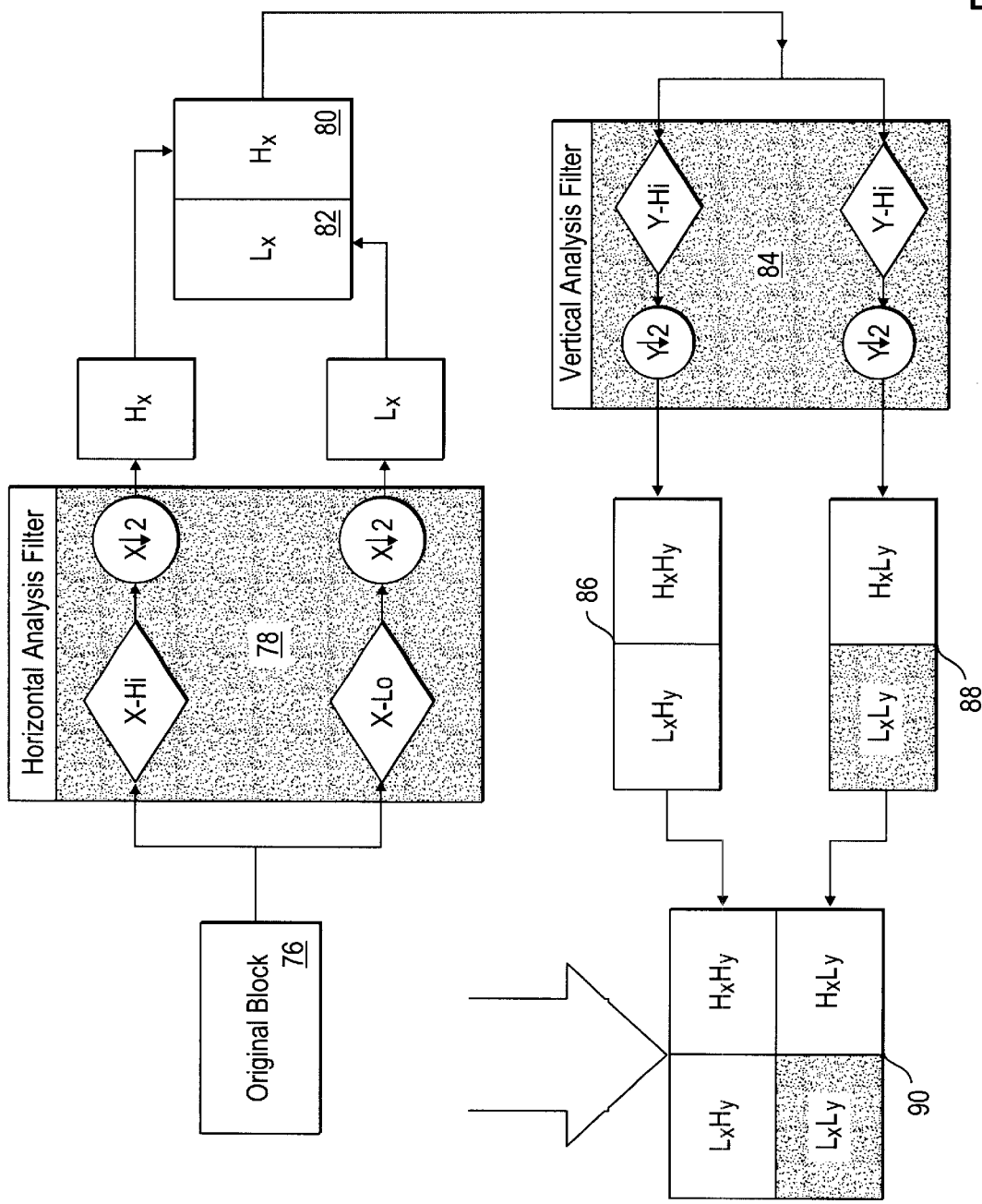
FIG. 9 is a schematic illustration of a two-dimensional wavelet analysis stage.

Referring also to FIG. 9, in the first filter stage or iteration in sub-band coding to obtain the Mallat blocks, the original block 76 (frame) is filtered at stage 78 into high and low frequency blocks 80 and 82 in the horizontal (x) direction (including decimation by 2 in the x direction, forming $L_x$ and $H_x$ blocks). The high and low frequency blocks 80 and 82 are subsequently filtered at stage 84 into high and low frequency blocks 86 and 88 in the vertical (y) direction (including decimation by 2 in the y direction, forming $H_y$ and $L_y$ blocks in each of the L and H blocks). The result of the first filter stage then is formation of the $L_xH_y$, $H_xH_x$, $L_xL_y$ and $H_yL_y$ blocks 90. Then in the next iteration, the $L_xL_y$ block gets substituted for the original block 76, and the analysis stage is repeated at the next resolution, and so on for subsequent stages.

Figure 10:
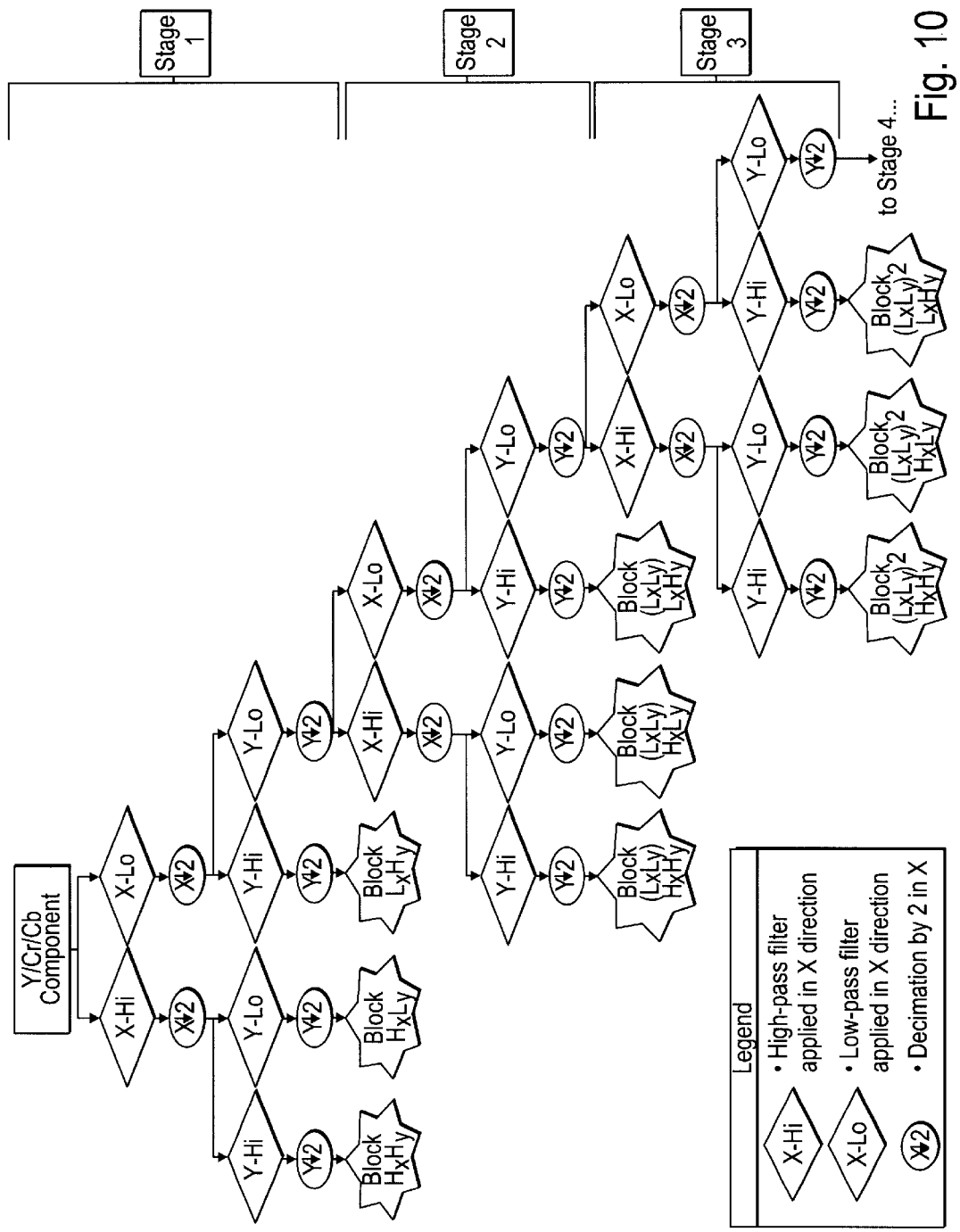
FIG. 10 is a schematic illustration of a wavelet analysis filter tree structure.

FIG. 10 illustrates the wavelet analysis filter tree structure for the first three representative stages of filtering. FIG. 8 shows the color component frame having been split into sub-band (Mallat) blocks after four stages of the logarithmic wavelet analysis filter bank. In one embodiment, five filtering stages are used.

The above filtering process may be applied to each of the Y, U and V component frames of each image frame. That is, values of the Y, U and V color components corresponding to each line of pixels of the image frame may be subject to the filtering process. Referring back to FIG. 8, the result of a four-stage analysis is shown. It is noted that the shaded area 62 in the lower left corner represents the lowest frequency (LL) block in both x and y dimensions, $(L_x L_y)^4$ whose size is only $(½×½)^4 = 1/256$ of the original size of the component frame.

In one embodiment of the present invention, a five-stage filter bank based on bi-orthogonal (9,7) filters is applied to frames in Y-U-V (4:2:2 subsampled) format. Where a memory is used to store the image data during this process, to simplify the iterative sub-band coding cycle it may be convenient to rearrange the data in the memory holding the filtered image data such that the low-frequency block always starts at the beginning of the addressible memory space. This way, it is only necessary to specify the dimensions of the block being processed, and use the same algorithm for multiple filtering stages.

It is noted that no compression (lossy or lossless) occurs at the wavelet analysis stage; this stage is just a transformation of the original signal into a different domain. However, the nature of this transform is well suited for compression for several reasons. As can be seen from the arrangement of low and high pass filters in the logarithmic tree in FIG. 10, the data in all Mallat blocks, except for the last (LL) one, are high pass filtered. This means that the mean pixel values in these high frequency blocks are typically zero, with a histogram (a probability distribution function) of the pixel values following a Gaussian (approximately $\exp(-x^2)$) distribution. The information contained in the high frequency blocks corresponds to sharp changes within a frame. However, the low frequency (LL) block contains a large amount of information in the image representation within a frame. For example, for a natural image (e.g., a person's facial image) having gradual changes between pixels, most of the signal energy is concentrated in the LL block. The high frequency blocks contain significantly much less energy.

The high frequency nature of all blocks but one (the smallest LL block) means that the data in them are more likely to contain zeros or strings of zeros than unfiltered image data. As previously noted, human vision is less sensitive to these higher frequencies, therefore the high-frequency blocks, occupying the most of the area, can be quantized "harder" (i.e., subjected to coarser sampling) than the low-frequency blocks without compromising image quality. Harder quantization results in more efficient run length coding and, consequently, more efficient compression.

c. Key Frame/Difference Frame

Referring back to FIG. 6, after the analysis at the wavelet filter bank 72, wavelet filtered data (i.e., the Mallat blocks) for the entire image frame (including separate Y, U and V components of the frame) is stored in a new frame buffer 96. This new frame's "signature" 98 is compared with the preceding frame's signature that has been stored in a signature holder 100. In one embodiment, the "signature" can be determined by referring to the luminance (Y) component of the entire LL block, which represents the "bird's-eye view" of a frame. Note that for a 640×480-pixel frame after five stages of wavelet filtering, the size of the LL block is only 20×15 pixels, or 300 samples.

Therefore, a "signature" can be thought of as a vector of dimension 300. Differencing "signatures" may then be accomplished using a vector subtraction operation. Depending on whether or not the signature difference exceeds a preset threshold, a decision is made at stage 102 as to whether the new frame should be considered a new "key" frame, or be treated as a difference frame. For the first frame in the video sequence, the signature of the preceding frame is null, so the first frame will always be treated as a key frame.

In case the signature threshold is exceeded (e.g., for the first frame, or when there is significant motion in the image so as to cause the inter-frame images to change significantly), the new frame is considered a key frame. In such cases, the frame is quantized by the adaptive quantizer 104 as is (i.e., without further modification), and is subsequently transmitted to the receiver with a "KF" (key frame) flag. Upon receiving a KF frame, the receiver will replace the contents of its frame buffer with the new arrival.

If the frame is determined to be a difference frame, it is directed to a subtractor 106 where the content of the compressed preceding frame (stored in an accumulation buffer 108) is subtracted from it, forming a difference. This difference is then quantized in the adaptive quantizer 104, and the quantized difference value is subsequently transmitted to the receiver with a "D" (difference) flag. Having received a D frame, the receiver will add it to the contents of its frame buffer.

d. Quantization

The adaptive quantizer 104 examines the statistics of each block and selects a set of "bin widths", or quantization intervals, depending on the energy of the data in the block. To quantize the data, the quantizer may adopt any suitable known algorithm, such as a scalar or vector quantization scheme [see, e.g., A. Gersho and R. M.Gray, *Vector Quantization and Signal Compression*, Kluwer, 1992]. Generally, for higher energy blocks, the bin widths are set narrower to reduce quantization error. The objective is to satisfy a limited bit budget (e.g., determined by factors such as the available transmission bandwidth in the channel 52) and to minimize the overall distortion introduced by quantization. The Mallat blocks are quantized in the order from low frequency (high resolution) to high frequency (low resolution) blocks. During this process, an attempt should be made to balance or equalize the bit budget within each resolution, and between the two chroma components within each block, to avoid spatial non-uniformnity and color skew in the restored frame.

e. Feedback

The quantized data is then forwarded to an entropy encoder 110. At the same time, the quantized frame, regardless of whether it is a key or a difference frame, is dequantized by the dequantizer 112 and is added to the contents of the accumulation buffer 108 (in the case of a difference frame), or is used to replace the previous frame stored therein (in the case of a key frame). It is noted that the data in the accumulation buffer 108 is in the wavelet domain. It is not necessary to de-waveletize this data, as it can be conveniently used as is for comparison with the new incoming frame that has been converted into wavelet representation. The signature of the current frame in the accumulation buffer 108 is determined as described above and stored in the signature holder 100, as it represents the image stored in the accumulation buffer 108.

f. Entropy Encoding

At the entropy encoder 110, the data is compressed and transmitted out (this later action may be accomplished using a radio or other media access device as described above). Further, the entropy encoder 110 may be implemented in accordance with Huffman or arithmetical entropy encoding that is well known in the art. See, e.g., M. Nelson and J. L.

Gailly, *The Data Compression Book*, M&T Books, 1995. The high frequency blocks (characterized, typically, by relatively low energy and large zero areas) lend themselves well to efficient run length encoding. It may be desirable, however, to subject the lowest frequency LL block (having relatively high energy and low data redundancy) to a different encoding scheme to improve efficiency. The output of the entropy encoder 110 is transmitted to the receiver via wired or wireless means, with a KF or D flag depending on the key or difference frame attribute of the data.

g. Bid Budget Allocation

In cases of limited transmission bandwidth or storage space, the bit budget for transmission or storage may be limited. In accordance with another aspect of the present invention, to ensure that the LL block is retained (for transmission or storage) with as much precision as possible within a limited transmission bandwidth or storage space, a bit budget allocation scheme has been developed to allocate the bits of the Mallat blocks to be retained for transmission or storage and the priority thereof. The bit budget allocation scheme is an implied, or indirect, quantization scheme, which can be better understood given a discussion of bit planes.

Figure 11:
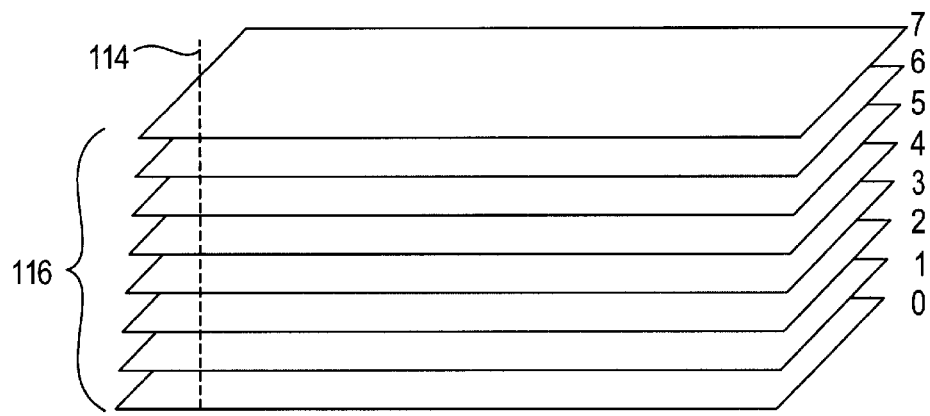
FIG. 11 is a schematic illustration of a bit-plane representation of an 8-bit digital image.
Figure 12:
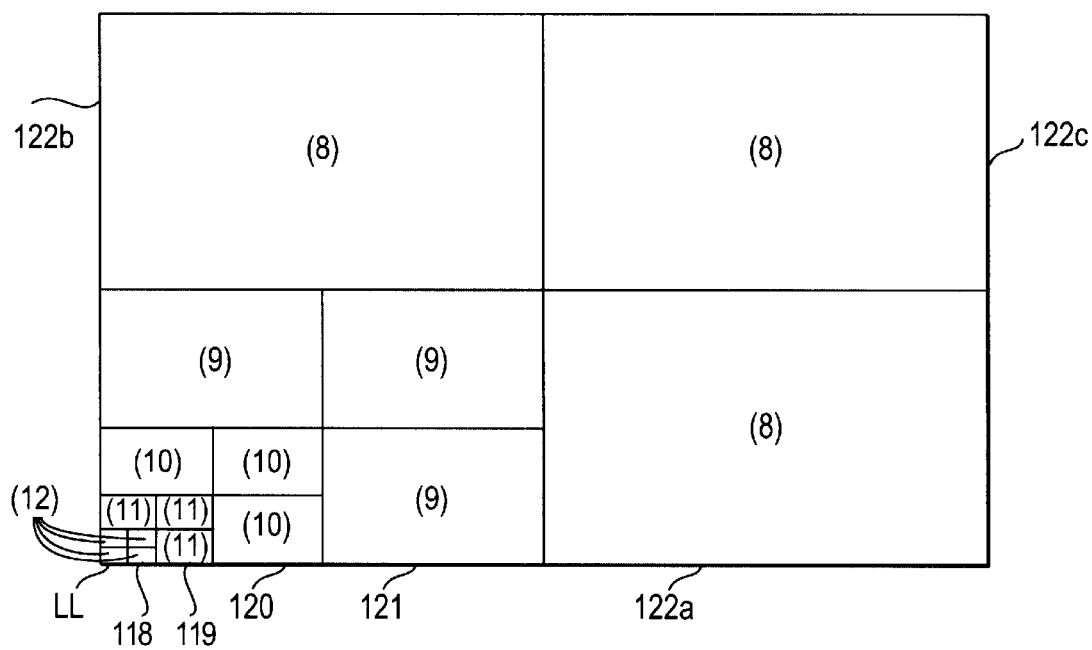
FIG. 12 is a schematic illustration of allocation of bit planes in each Mallat block for transmission in accordance with one embodiment of the bid budget allocation scheme.

For ease of discussion, consider that each pixel (see FIG. 11, at 114) of Y, U or V data in a frame is represented by an 8-bit byte (i.e., values ranging from 0 to 255). Imagine that the frame is composed of eight 1-bit planes 116, ranging from plane 0 for the least significant bit to plane 7 for the most significant bit. In terms of 8-bit bytes, plane 0 contains all the lowest order bits in the bytes comprising the pixel samples in the frame, and plane 7 contains all the highest order bits. Thus, the higher order bit planes contain visually significant data. In fact, bit plane 7 corresponds exactly with an image threshold at gray level 128 for an 8-bit data. The lower order bit planes contribute to more subtle details in the image.

In accordance with the present invention, in cases of limited transmission bandwidth, generally only the higher order bit planes are transmitted. Further, the different Mallat blocks are prioritized in accordance with their resolution levels, in that more bit planes of the lower frequency blocks are allocated to be transmitted.

The reasoning behind the bit plane allocation is as follows. By transmitting the 7-bit plane of all samples for a block, it is possible to determine that those samples that have a binary "1" value in this bit plane will have a value at or above 128 (i.e., $2^7$), and those samples that have a binary "0" in this bit plane will have a value below 128. Accordingly, by transmitting only one eighth of the data for the samples in the block, it can be determined which sample is greater or less than half of their full-scale value, and in which half it will be.

By transmitting next the 6-bit plane, one can further quantize the value of the samples within a quadrant of the full range value (i.e., the value of the sample can be determined with an accuracy of a quadrant). For example, a sample have a "1" in the 7-bit plane and a "1" in the 6-bit plane necessarily has a value at or above 192. A sample having a "0" in the 7-bit plane and "0" at the 6-bit plane has a value below 64. Similar analysis will show that the value of the sample can be determined to be in the other two quadrants (i.e., equal or greater than 128 but less than 192 and equal or greater than 64 but less than 128). By the time the two highest bit planes have been transmitted then, the value of the samples may be narrowed to within one quarter of their full range value, which is equivalent to allocating 2 bits per block's sample. It follows that every following bit plane is a binary refinement (i.e., by a factor of 2). Consequently, depending on the available transmission bandwidth, it may be adequate to transmit only the upper bit planes without too much compromise on the precision of the blocks.

In view of the asymmetric level of detail and precision between the higher and lower frequency blocks, the lower frequency blocks should be allocated a larger number of bit planes to be transmitted, so as to provide as much precision as possible for higher image details contained therein. The high frequency blocks may only have a few or no bit planes transmitted, depending on whether there is budget remaining in the bandwidth.

Consider now the example of a 16-bit fixed-point representation of samples in a frame, where 9 bits carry the integer part, and the remaining 7 bits the fractional part of a sample. There would be 16 bit planes, from 0-bit to 15-bit planes. The 15-bit plane represents the sign of the data, the 14-bit to 7-bit planes represent the integer part of the data, and the 6-bit to 0-bit planes represent the fractional part of the data. According to one embodiment of the present invention, the number of upper bit planes to be transmitted for different frequency levels of the Mallat blocks are as follows (higher level of blocks are adjacent the preceding level of blocks, see FIG. 9):

LL block=16 bit planes

First resolution blocks 118=12 bit planes

Second resolution blocks 119=II bit planes

Third resolution blocks 121=10 bit planes

Fourth resolution blocks 122=9 bit planes

Fifth resolution blocks 123=8 bit planes

All the allocated bit planes within a given resolution are transmitted in sequence for all blocks within such resolution before the bit planes of the next resolution are transmitted.

As mentioned above, an attempt should be made to balance or equalize the bit budget within each resolution, and between the two chroma components within each block, to avoid spatial non-uniformity and color skew in the restored frame. This is achieved by transmitting bit planes in the same bit level for all the blocks in a given resolution before transmitting the bit planes in the next bit level. If there is insufficient transmission bit budget to accommodate transmission of the bit planes in the same level for all the blocks in the same resolution, then none of such bit planes should be transmitted. For each frame, the bit planes are transmitted in the order described above, until the bit budget for the transmission bandwidth has been reached. The bit planes remaining will be "discarded" (i.e., taken as having "zero" value and are not transmitted) and the bit planes for the next frame are then transmitted with the same bit allocation.

It is noted that the bit budget allocation scheme does not involve data compression. It merely prioritizes the data to be transmitted in accordance with the frequency level of the Mallat blocks, and the data that cannot fit into the transmission bandwidth will have to be truncated and not transmitted. In other words, it is an implied, or indirect, quantization scheme. The low priority data is thus lost due to the limited transmission bandwidth budget. The bit budget allocation scheme is therefore a lossy transmission scheme, as any scheme involving data quantization must be. Because the allocation is the same for each frame, such loss cannot be recovered by the feedback scheme for compression (which is for recovering quantization errors) described earlier.

The bid budget allocation scheme may be implemented as part of the adaptive quantizer 104 or, with some modification to the embodiment depicted in FIG. 8, as part of the entropy encoder 110. The bit-planes that are designated to be transmitted may be subject to run length (entropy) encoding before they are transmitted.

While the bid budget allocation scheme has been described using the example of limited transmission bandwidth, it should be understood that the bit budget allocation scheme may be adopted for limited storage space without departing from the scope and spirit of the present invention. Moreover, it should be appreciated that the foregoing sequence of steps is iterated for each incoming frame.

II. Decompression Processing

Figure 13:
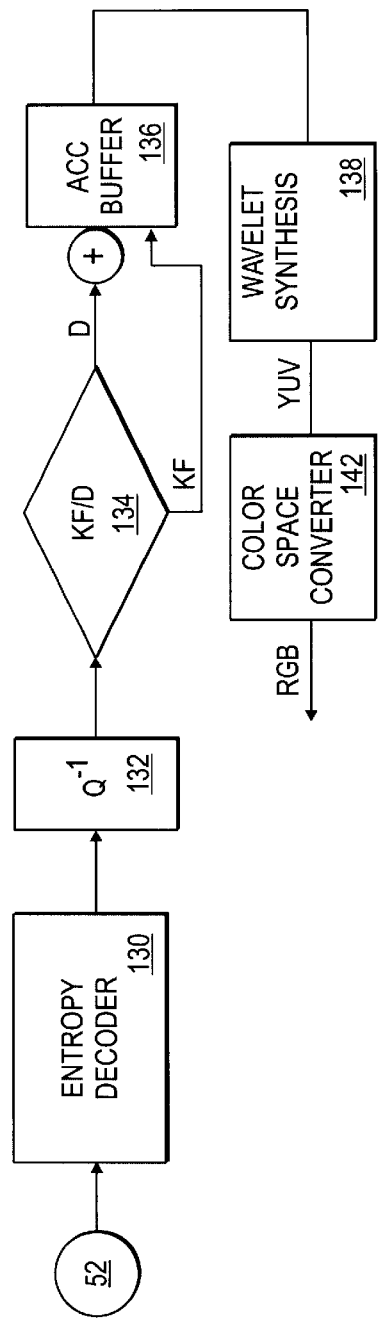
FIG. 13 is a more detailed schematic block diagram of an implementation of the complementary decompression scheme for the compression scheme illustrated in FIG. 6.

At the receiver side, the data received goes through essentially the reverse of the compression cycle at the transmission side. Referring to FIG. 13, one embodiment of an implementation of a decompression scheme that complements the adaptive feedback feature of the present invention is explained with reference to the compressed data received from the compression and transmission implementation of FIG. 6.

a. Entropy Decoding

An entropy decoder 130 decodes the frame of compressed Y-U-V wavelet data stream received via the transmission channel 52 into a quantized set of wavelet domain bands (i.e., the Mallat blocks shown in FIG. 8). The entropy decoder 130 should be selected to complement the specific entropy encoder on the transmission side, so that the compressed data can be properly decoded to recover the original data. If a bit allocation scheme similar to that described above was used on the transmission side, the entropy decoder 130 should be configured to recognize the incoming data stream in accordance with the bit plane sequence discussed above.

b. Post Augmentation

According to another aspect of the present invention, to enhance the accuracy of received (i.e., recovered) data that was subject to the bit allocation scheme, a post augmentation scheme is introduced to augment the values represented by the limited number of transmitted bit planes. For to the post augmentation scheme, an assumption is made that the actual value of the data received is taken to be an augmented value that lies between the indicated value represented by the bit planes and the value represented by the next possible higher binary value that can be represented by the allocated bit planes. More particularly, in accordance with one embodiment of the present invention, the augmented value is the average or median value between the two binary values. This statically minimizes the error introduced by the implied data quantization as a result of the limited bit plane transmissions.

To illustrate, consider sample data that is represented by 8-bits. Consider further that only two bit planes (7-bit and 6-bit planes) were transmitted for a block. For a sample that has a "1" in the 7-bit plane and "0" in the 6-bit plane, the transmitted value is 128. However, it can be deduced that the actual value of this sample must lie in the third quadrant of the full range, i.e. between $2^7$ and the next possible binary value $2^6$, when the 6-bit plane is also "1" (i.e., between 128 and $2^7+(2^5+2^4+2^3+2^2+2^1+2^0)=2^7+(2^{5+1}-1)=191$). According to one embodiment of the post augmentation scheme, the actual value of the sample is augmented and taken to be the middle of the quadrant, or 160 (the integer value of the average of 128 and 191). To put it in another way, the sample value is augmented to be the average or median of its indicated value with all non-transmitted bit planes being zero and its indicated value with all non-transmitted bit planes being one.

In another example, if the 7-bit is "0" and the 6-bit is "1", the indicated value of the sample is 64. According to the post augmentation scheme, the actual sample value is taken to be 96, which is the average of 64 and 127. The same analysis applies to sample represented by other transmitted bit planes. For the example when the 7-bit is "1" and the 6-bit is also "1", the indicated value is 192, but the augmented value would be 224 (i.e., the average of 192 and 255).

The underlying rationale for the post augmentation scheme is that, from a statistical perspective, there is an uniform probability distribution for values between two binary bits (e.g., between 128 and 255). Therefore, the average of these two values would render a value with statistically minimized error, because for each pixel a maximum introduced error is only 50% of what it could be without post-augmentation. The error present in this scheme is reduced as increasing number of bit planes are transmitted, as the uncertainty between two lower binary bit values decreases, and such uncertainty is also marginal in reference to the full range (e.g., the uncertainty between 3-bits (8) and 4-bits (16) is small and is marginal in reference to 255 full range). It follows that even if there was 50% error in making the augmentation to a higher value, the error may still be marginal.

There is one exception to the augmentation scheme described above. In the event that the 7-bit and 6-bit are both "0", it would not be proper to augment the value of the sample to 32, the average of 0 and 63 (or $2^6$). It certainly would not be appropriate to give the sample an augmented value between 0 and 255 (i.e., 128). To do so would require an assumption that does not commensurate with the many unknowns about those bit planes that have not been transmitted. For example, in case only two upper bit planes have been transmitted, the remaining six bit planes may all take on null values. To otherwise use an augmented value of 32 would result in gross error in reference to the range of 0 to 64. This may result in unpleasant artifacts in the restored image. In such instances, it is safer to assume the sample value to be 0. Because the lower bit planes contain less significant bits, even if the actual value of the sample is not 0, the error resulting from assigning 0 to be the actual value may still be marginal from a statistical perspective. Accordingly, in the absence of any value indicated by the transmitted bit planes, it is better (statistically) to assign a value of 0 to the sample. The post augmentation scheme may be implemented as part of the entropy decoder 130 or dequantizer 132.

c. Dequantizer

A dequantizer 132 may be provided to scale up the quantized data into large-range values. The KF/D flag in the data is identified at stage 134 to determine whether the incoming frame is a key frame or a difference frame. If it is a key frame, it replaces the frame data in the accumulation frame buffer 136. (The firstframe by its nature would be a key frame.) If it is a difference frame, it is added to the existing frame data in the accumulation buffer 136. The accumulation buffer 136 therefore holds the most current Y-U-V frame data represented in wavelet domain. This data needs to be converted back to spatial domain by wavelet synthesis.

d. Wavelet Synthesis

Figure 14:
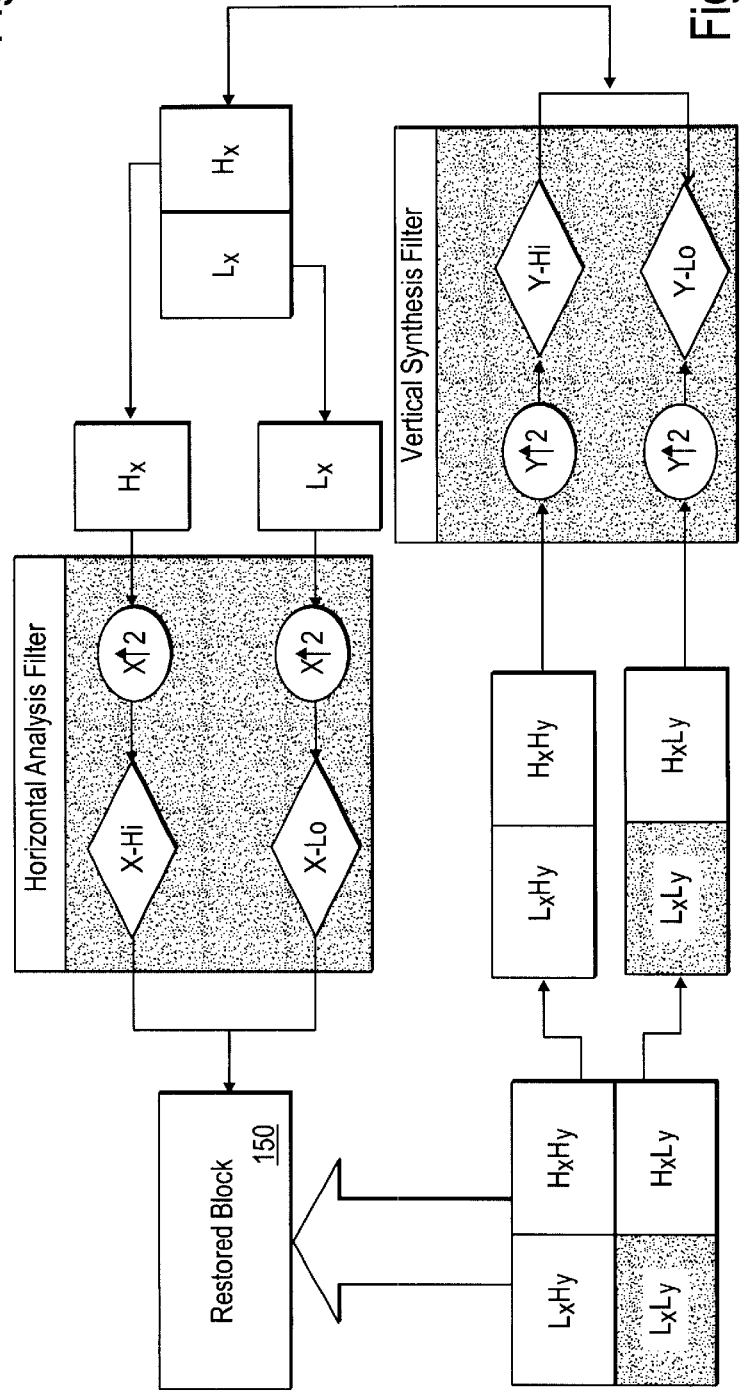
FIG. 14 is a schematic illustration of a two-dimensional wavelet synthesis stage.

The wavelet synthesis stage 138 is conceptually an exact reversal of the wavelet analysis stage. The sequence of operation is inversed compared to that in the wavelet filter bank 72. Specifically, two lowest blocks (in each dimension) are taken together, up-sampled by 2, and run through the synthesis filters, as shown in FIG. 14. The procedure is repeated for four additional iterations (if the wavelet analysis involved 5 stages), by substituting the then four lowest frequency blocks (including the preceding restored block 150 as one of the four blocks), until an original image size is obtained. To complement the algorithm adopted for the wavelet analysis described above, the wavelet synthesis many adopt the algorithm developed by Analog Devices, Inc. and implemented in its ADV 601 chip.

e. Color Space Conversion

The output of the synthesis filter bank is the decompressed image in Y-U-V space. The Y-U-V data may then be converted into R-G-B color space by a converter 142, if desired (e.g., for display by a computer monitor or further processing by a digital computer). Alternatively, the Y-U-V data may be further processed for display by a television set.

The foregoing describes the various aspects of the present invention. The compression engine of the present invention may be implemented in integrated circuits such as an ASIC (Application Specific Integrated Circuit) or made part of a graphics processor. The feedback scheme of the present invention is also applicable to (and easily integrated into) any existing intraframe compression algorithm. Given the disclosure herein of the various structures, processes and functions of the present invention, it is within the ability of one skilled in the art to design the programs, software, coding, etc., which are necessary to implement the present invention.

While the invention has been described with respect to the described embodiments in accordance therewith, it will be apparent to those skilled in the art that various modifications and improvements may be made without departing from the scope and spirit of the invention. Certain parts or components may be omitted from the system described in reference to the figures (e.g., the color space converter may be omitted if the incoming stream is already in the desired fonnat for data compression). The feedback scheme, post augmentation scheme, and bit budget allocation scheme may be adopted in part or together in a system, or independently and separately adopted in different systems. A compression system may not need to adopt all the foregoing schemes. Furthermore, the individual schemes may be advantageously applied to other types of systems without departing from the scope and spirit of the present invention. For example, the post augmentation scheme may be applied in any system that involves recovery of quantized data. The bit allocation scheme may be applied in any system that involves data processing and/or transmission with limited bandwidth constraints. Accordingly, it is to be understood that the invention is not to be limited by the specific illustrated embodiments, but only by the scope of the appended claims.

What is claimed is:

1. In a system for compaction of image frames that are in a spatial domain, which is structured and configured to update a transmitted preceding frame that underwent compaction using inter-frame differences between a current frame and the preceding frame, an improvement for reducing distortions comprising:

transformation means for transforming the frames into a wavelet domain to produce blocks of data; and means for selectively quantizing the data in the wavelet domain wherein quantization intervals for each of the blocks of data are selected according to an energy content of a respective block.

2. The improvement of claim 1 wherein blocks with relatively high energy content are assigned narrower quantization intervals than blocks with relatively low energy content.

3. The improvement of claim 2 further comprising comparison means for obtaining difference data that represents a difference between data representing the current frame and data representing the compacted preceding frame; wherein the difference data is to be applied for reconstructing a transmitted current frame based on the transmitted preceding frame.

4. The improvement of claim 2 wherein the blocks are quantized in order from those representing low frequency components of the image frames to those representing high frequency components of the image frames.

5. The improvement of claim 2 wherein each block includes two chroma components of the image frames and the quantization is performed so as to equalize a set budget within varying resolution components of the chroma components.

* * * * *